US 6,625,358 B2

(12) United States Patent
Bourget

(10) Patent No.: US 6,625,358 B2
(45) Date of Patent: Sep. 23, 2003

(54) OPTICAL FIBER CABLE AND A METHOD OF FABRICATING IT

(75) Inventor: Vincent Bourget, Marly le Roi (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/026,441

(22) Filed: Dec. 27, 2001

(65) Prior Publication Data

US 2002/0085821 A1 Jul. 4, 2002

(30) Foreign Application Priority Data

Dec. 28, 2000 (FR) .............................. 00 17190

(51) Int. Cl.[7] ................................. G02B 6/44
(52) U.S. Cl. ....................................... 385/113
(58) Field of Search ................. 385/102, 106, 385/103, 104, 105, 109, 110, 111, 112, 113

(56) References Cited

U.S. PATENT DOCUMENTS 6,377,738 B1 * 4/2002 Anderson et al. ........... 385/113

FOREIGN PATENT DOCUMENTS

| EP | 0033123 A2 | 8/1981 |
| EP | 0846970 A1 | 6/1998 |
| FR | 2394157 | 1/1979 |

* cited by examiner

Primary Examiner—Javaid H. Nasri
(74) Attorney, Agent, or Firm—Sughrue Mion, PLLC

(57) ABSTRACT

The cable with optical fibers includes a filamentary strength member made of a material with a low coefficient of expansion in longitudinal contact with a contiguous member having a high coefficient of expansion. To increase the friction or adhesion between the strength member and the contiguous member, the strength member and/or the contiguous member has striations on its surface in contact with the other member. The striations for increasing friction or adhesion are preferably formed on the strength member or on the contiguous member using knurling means for knurling said member.

13 Claims, 3 Drawing Sheets

OPTICAL FIBER CABLE AND A METHOD OF FABRICATING IT

BACKGROUND OF THE INVENTION

Optical fiber cables, referred to hereinafter as optical cables, usually have one of three types of structure.

In a first type of structure, the optical cable includes a central filamentary strength member around which tubes accommodating optical fibers are assembled in a helical or an SZ configuration. The tube assembly is covered with a sheath. In this first type of structure, the tubes containing the optical fibers are defined by relatively thick and rigid walls of synthetic material. The optical fibers can move relative to the tubes that contain them. Cables having a structure of the first type are described in the documents U.S. Pat. No. 4,366,667 and EP-A-0 846 970, for example.

In a second type of structure, the optical cable includes a single synthetic material tube, usually referred to as an "uni-tube", accommodating optical fibers and, where applicable, tapes, which may be assembled together in a helical configuration. The unitube is covered with a sheath defined by a wall in which filamentary strength members may be embedded.

In a third type of structure, the optical cable includes synthetic material tubes accommodating the optical fibers and assembled together in a helical or an SZ configuration. The assembly of tubes is covered with a sheath defined by a wall in which filamentary strength members are embedded. In this third type of structure, the tubes containing the optical fibers are relatively thin and flexible and they grip the optical fibers that they contain and prevent virtually all relative movement between the optical fibers and the tubes containing them.

In all three types of structure, the synthetic material sheath is usually extruded around what is usually called the optical core; in the first type of structure the optical core comprises the filamentary strength member and the tubes, in the second type of structure it comprises the uni-tube and the strips, if any, and in the third type of structure it comprises the assembly of tubes.

The filamentary strength member is made of steel, for example, or a composite material containing resin and glass fibers. The coefficient of expansion of the strength member is relatively low. On the other hand, the strength member is in longitudinal contact with at least one contiguous member whose coefficient of expansion is relatively high, generally 100 times greater than the coefficient of expansion of the strength member. Depending on which type of structure is used in the optical cable, the contiguous member is a tube containing the optical fibers, and which is generally of polypropylene (PP) or polybutyleneterephtalate (PBTP), or even of polyethylene, in the first type of optical cable structure, or the sheath, which is generally of polyethylene (PE) or polyamide (PA) in the second and third types of optical cable structure.

Consequently, when a cable is subjected to large temperature differences, the difference between the coefficients of expansion of the strength member and the contiguous members causes disparities in the behavior of the various components of the cable.

To remedy these disparities caused by differential expansion in optical cables having a structure of the first or third type, it is possible to reduce the assembly pitch of the helical or SZ configuration of tubes in order to increase the length of the tubes per unit length of the strength member, for example. However, this solution is relatively costly, because shortening the assembly pitch of the helical or SZ configuration of tubes increases the length of the optical fibers per unit length of the cable.

Optical cables having a structure of the first or third type generally include cords for retaining the tubes and these cords can attenuate the differential expansion of the strength member(s) and the tubes. However, the retaining cords have insufficient effect in terms of attenuating differential expansion.

OBJECTS AND SUMMARY OF THE INVENTION

One particular object of the invention is to attenuate effectively differential expansion of the filamentary strength member and the contiguous member(s) in longitudinal contact therewith in an optical cable.

To this end, the invention provides an optical fiber cable including a filamentary strength member made of a material with a low coefficient of expansion and in longitudinal contact with a contiguous member having a high coefficient of expansion, wherein, to increase friction or adhesion between the strength member and the contiguous member, the strength member and/or the contiguous member has striations on its surface in contact with the other member.

According to features of various embodiments of the optical fiber cable:

- the strength member is buried in a sheath forming said contiguous member and housing the optical fibers, the strength member having striations for increasing its adhesion to the material of the sheath that surrounds it;
- the cable includes an assembly of two or more tubes housing the optical fibers and housed in the sheath;
- the tubes are assembled in a helical or SZ configuration inside the sheath;
- the cable includes two or more tubes housing the optical fibers and assembled around the strength member, each tube constituting a contiguous member;
- the tubes are assembled around the strength member in a helical or SZ configuration;
- the strength member has striations to increase friction with the tubes; and
- each tube has striations to increase friction with the strength member.

The invention also provides a method of fabricating an optical fiber cable as defined hereinabove, wherein striations for increasing friction or adhesion are formed on the strength member or on the contiguous member using knurling means for knurling said member.

According to other features of the above method of fabricating an optical fiber cable:

- the strength member is made of a composite material containing resin and glass fibers and the knurling is applied to the outside surface of the strength member when it has been softened by heating it or the knurling means;
- each tube is made of a synthetic material and the knurling is applied to the outside surface of each tube at the exit from a head for extruding the tube;
- each tube is made of a synthetic material and the knurling is applied to the outside surface of each tube when assembling that tube with the strength member, with the outside surface of the tube softened by heating it or the knurling means; and the knurling means include a knurling wheel provided with a peripheral groove defined by a knurled surface adapted to come into contact with either the strength member or the contiguous member.

BRIEF DESCRIPTION OF THE DRAWINGS

The invention will be better understood on reading the following description, which is given by way of example only and refers to the accompanying drawings, in which.

MORE DETAILED DESCRIPTION

Figure 1:
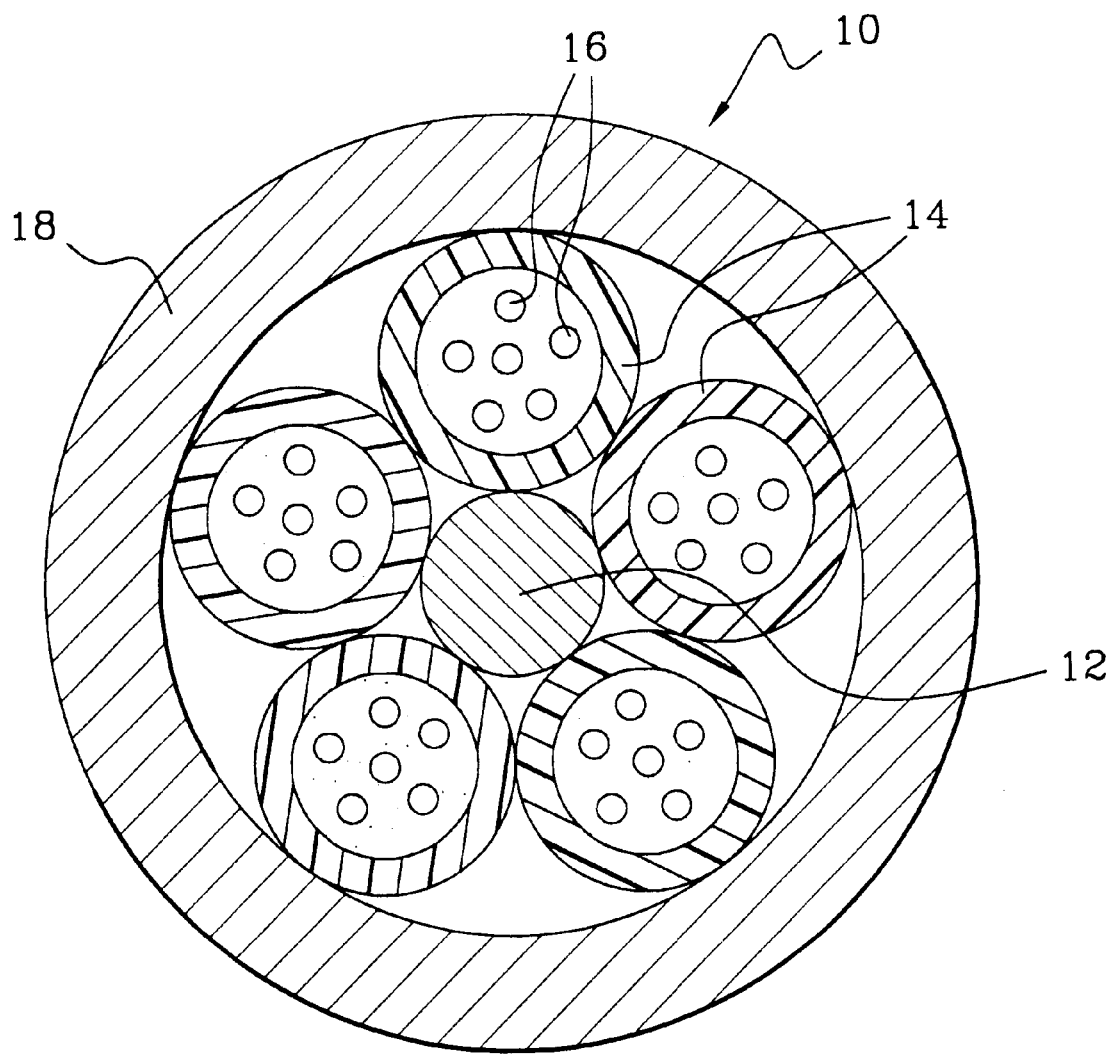
FIG. 1 is a sectional view of a first embodiment of an optical cable according to the invention.

FIG. 1 shows diagrammatically a first embodiment of an optical fiber cable 10 in accordance with the invention.

The optical cable 10 includes a filamentary strength member 12 around which tubes 14 are assembled, for example five tubes. A conventional bundle of optical fibers 16 is housed in each tube 14. Each tube 14 contains about twelve optical fibers 16, for example. The number of optical fibers 16 may be different, however.

The assembly comprising the strength member 12 and the tubes 14 is covered with a conventional thermoplastics synthetic material sheath 18 made of polyethylene (PE) or polyamide (PA), for example. The tubes 14 preferably constitute a conventional helical or SZ assembly inside the sheath 18.

The filamentary strength member 12 is made of a composite material containing resin and glass fibers. The strength member 12 can instead be made of steel. The coefficient of expansion of the strength member 12 is relatively low.

The tubes 14, which are made of a conventional thermoplastics synthetic material, for example polypropylene (PP) or polybutyleneterephtalate (PBTP), or even polyethylene, are in longitudinal contact with the strength member 12. The coefficient of expansion of the material of the tubes 14 is relatively high, generally 100 times greater than the coefficient of expansion of the strength member 12.

The outside surfaces of the strength member 12 and the tubes 14 have striations 20 for increasing the friction between the strength member 12 and the tubes 14. By "striations" is meant a set of shallow grooves separated by low crests; the striations are not necessarily parallel to each other or distributed in a regular manner.

Figure 2:
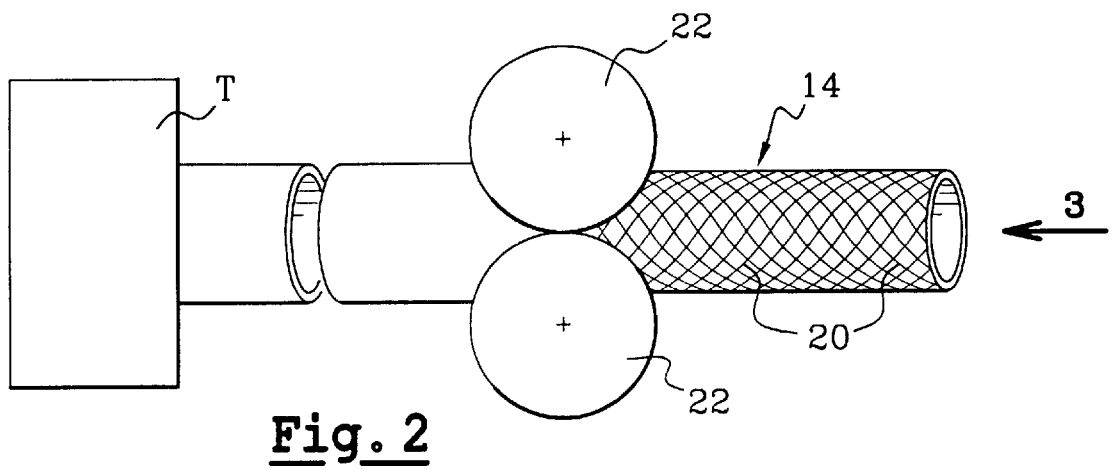
FIG. 2 is a side view of knurling means for knurling a first member of the optical cable shown in FIG. 1.
Figure 3:
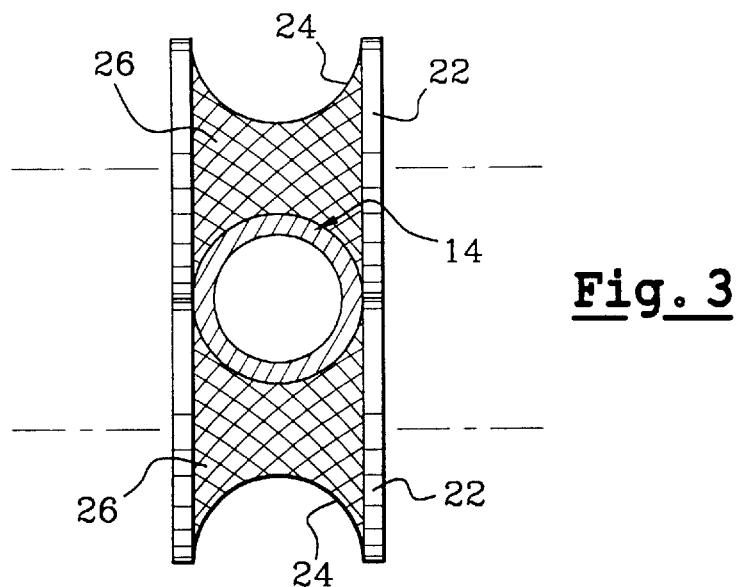
FIG. 3 is a view of the knurling means as seen in the direction of the arrow 3 in FIG. 2.

The striations 20 are preferably formed by knurling, for example using the knurling means shown in FIGS. 2 and 3.

These figures show knurling means for knurling a tube 14. The knurling means include two superposed knurling wheels 22 with parallel axes substantially orthogonal to the axis of the tube 14. Each knurling wheel 22 has a peripheral groove 24 defined by a knurled surface 26 adapted to come into contact with the outside surface of the tube 14. The knurled surface produces a complementary imprint on the outside surface of the tube 14.

Each knurling wheel 22 knurls substantially a corresponding longitudinal half of the tube 14.

The knurling wheels 22 are placed at the exit from a head T for extruding the tube 14, for example. The temperature at the outside surface of the tube 14 is then still relatively high, which facilitates knurling the outside surface. The knurling wheels 22 are driven by the displacement of the tube 14 at the exit from the extrusion head T.

The outside surface of the tube 14 can instead be knurled when assembling the tube 14 to the strength member 12. In this case, using a conventional method, the tube 14 is unwound from a storage spool and wound around the strength member 12 in a helical or SZ configuration. The knurling wheels 22 are in contact with a section of the tube 14 between the storage spool and the strength member 12. To facilitate knurling, the outside surface of the tube 12 is preferably softened by heating it or the knurling wheels 22.

The outside surface of the composite material strength member 12 is knurled (see FIG. 4) using knurling wheels similar to those shown in FIGS. 2 and 3. The knurling is preferably applied to the outside surface of the strength member 12 when it has been softened by heating it or the knurling wheels.

Knurling can instead be applied only to the strength member 12 or only to the tubes 14.

Providing the outside surface of the strength member 12 and/or each tube 14 with friction enhancing striations strengthens the cohesion between the strength member 12 and the tubes 14. Thus the behavior of the assembly comprising the strength member 12 and the tubes 14 on expansion approximates the behavior of the strength member 12 on expansion. This reduces the risk of differential expansion of the various members constituting the optical cable assembly.

Figure 5:
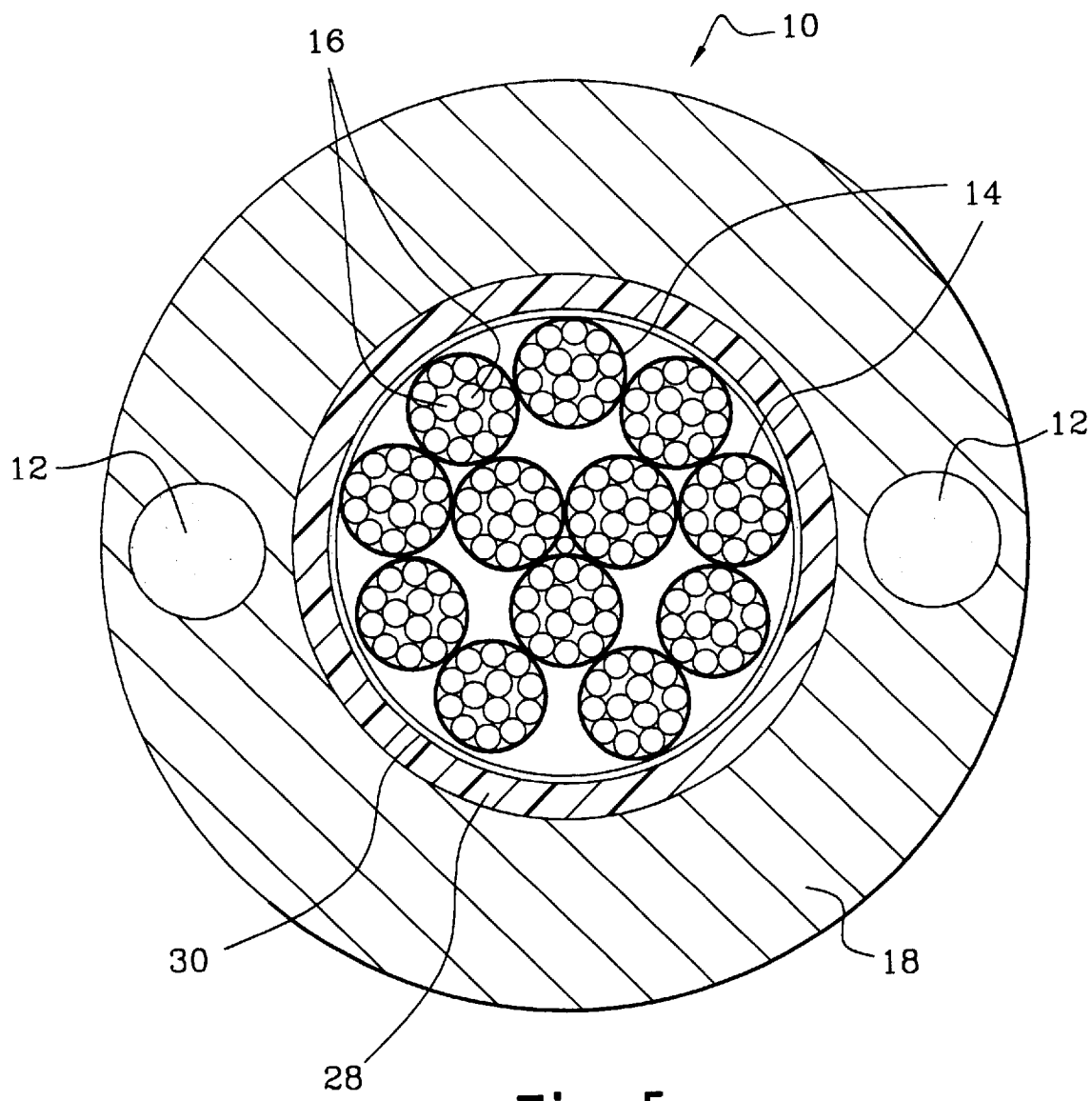
FIG. 5 is a view similar to FIG. 1 of a second embodiment of an optical cable in accordance with the invention.

FIG. 5 shows diagrammatically a second embodiment of an optical fiber cable 10 in accordance with the invention. In this figure, items analogous to those of the preceding figures are designated by the same reference numbers.

The optical cable 10 includes an assembly of flexible tubes 14 each housing a bundle of conventional optical fibers 16. Each tube 14 contains about twelve optical fibers 16, for example. The number of optical fibers 16 can be different, however.

In the example shown, the optical cable 10 includes twelve tubes 14. The number of tubes 14 can be different, however.

The assembly of tubes 14 is covered with a sheath 18. The tubes 14 are preferably assembled in a conventional helical or SZ configuration inside the sheath 18.

In this second embodiment of the invention the optical cable 10 includes two diametrally opposed filamentary strength members 12 embedded in the wall defining the sheath 18.

The optical cable 10 preferably includes mechanical reinforcing braids 28, for example aramide braids, extending radially between the tubes 14 and the sheath 18 in an annular, for example helical, assembly.

The optical cable 10 preferably also includes conventional sealing members. The sealing members can include a sealing tape 30 extending radially between the tubes 14 and the sheath 18, more particularly between the tubes 14 and the assembly of reinforcing braids 28, in a conventional annular assembly.

The strength members 12, the tubes 14 and the sheath 18 are made of materials similar to those referred to in connection with the first embodiment of the invention. The coefficient of expansion of the material of the sheath 18 is relatively high, generally about 100 times greater than the coefficient of expansion of the material of the strength members 12.

Note that in this second embodiment of the invention the wall of the tubes 14 is relatively thin, as is usually the case for the tubes 14 of an optical cable of the type with strength members at the periphery of the assembly of tubes.

Figure 4:
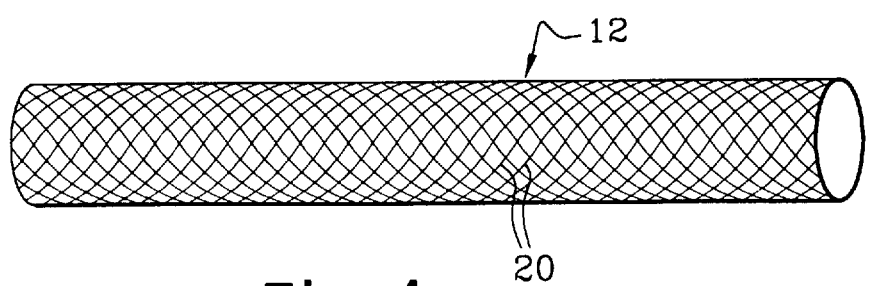
FIG. 4 shows a second member of the optical cable, provided with striations to increase friction against or adhesion to a contiguous member.

In this second embodiment of the invention, the outside surfaces of the strength members 12 have striations 20 like those shown in FIG. 4. The striations 20, formed by knurling in a similar manner to that of the first embodiment of the invention, increase adhesion between the strength members 12 and the material of the sheath 18.

Providing the outside surfaces of the strength members 12 with adhesion increasing striations strengthens the cohesion between the strength members 12 and the sheath 18. Thus the behavior of the assembly including the strength members 12 and the sheath 18 on expansion approximates the behavior of the strength members 12 on expansion. This reduces differential expansion of the various components of the optical cable.

Of course, the invention applies equally to strength members embedded in the sheath of a "uni-tube" type optical cable, as described in the preamble of this specification.

The advantages of the invention include the fact that it effectively attenuates differential expansion in an optical cable of each filamentary strength member and each contiguous member in longitudinal contact therewith using very simple means that are easy to put into practice.

What is claimed is:

1. A cable with optical fibers, said cable including a filamentary strength member made of a material with a low coefficient of expansion and in longitudinal contact with a contiguous member having a high coefficient of expansion, wherein, to increase friction or adhesion between the strength member and the contiguous member, the strength member and/or the contiguous member has striations on its surface in contact with the other member.

2. A cable according to claim 1, wherein the strength member is buried in a sheath forming said contiguous member and housing the optical fibers, the strength member having striations for increasing its adhesion to the material of the sheath that surrounds it.

3. A cable according to claim 2, including an assembly of two or more tubes housing the optical fibers and housed in the sheath.

4. A cable according to claim 3, wherein the tubes are assembled in a helical or SZ configuration inside the sheath.

5. A cable according to claim 1, including two or more tubes housing the optical fibers and assembled around the strength member, each tube constituting a contiguous member.

6. A cable according to claim 5, wherein the tubes are assembled around the strength member in a helical or SZ configuration.

7. A cable according to claim 5, wherein the strength member has striations to increase friction with the tubes.

8. A cable according to claim 5, wherein each tube has striations to increase friction with the strength member.

9. A method of fabricating a cable according to claim 1, wherein striations for increasing friction or adhesion are formed on the strength member or on the contiguous member using knurling means for knurling said member.

10. A method according to claim 9, wherein the strength member is made of a composite material containing resin and glass fibers and the knurling is applied to the outside surface of the strength member when it has been softened by heating it or by heating the knurling means.

11. A method according to claim 9, wherein a tube is made of a synthetic material and the knurling is applied to the outside surface of said tube at the exit from a head for extruding the tube; and wherein said tube is a continuous member.

12. A method according to claim 9, wherein a tube is made of a synthetic material and the knurling is applied to the outside surface of said tube when assembling that tube with the strength member, with the outside surface of the tube softened by heating it or by heating the knurling means; and wherein said tube is a contiguous member.

13. A method according to claim 9, wherein the knurling means include a knurling wheel provided with a peripheral groove defined by a knurled surface adapted to come into contact with either the strength member or the contiguous member.

* * * * *